(12) United States Patent
Sim et al.

(10) Patent No.: US 8,272,728 B2
(45) Date of Patent: Sep. 25, 2012

(54) METHOD AND APPARATUS FOR REVERSE PRINTING ON A FLEXIBLE LENTICULAR SUBSTRATE

(75) Inventors: Wong Hoo Sim, Singapore (SG); Toh Onn Desmond Hii, Singapore (SG)

(73) Assignee: Creative Technology Ltd, Singapore (SG)

( * ) Notice: Subject to any disclaimer, the term of this patent is extended or adjusted under 35 U.S.C. 154(b) by 358 days.

(21) Appl. No.: 12/681,267

(22) PCT Filed: Sep. 29, 2008

(86) PCT No.: PCT/SG2008/000370
§ 371 (c)(1),
(2), (4) Date: Apr. 1, 2010

(87) PCT Pub. No.: WO2009/045171
PCT Pub. Date: Apr. 9, 2009

(65) Prior Publication Data
US 2010/0245431 A1    Sep. 30, 2010

(30) Foreign Application Priority Data

Oct. 1, 2007  (SG) .................................. 200716390

(51) Int. Cl.
*B41J 2/01* (2006.01)
(52) U.S. Cl. .................. 347/101; 347/2; 347/5; 347/16; 347/19; 347/104; 347/105; 347/106; 347/107
(58) Field of Classification Search ........................ None
See application file for complete search history.

(56) References Cited

U.S. PATENT DOCUMENTS

| 5,959,718 A | 9/1999 | Morton |
| 2006/0023197 A1 | 2/2006 | Joel |

*Primary Examiner* — Matthew Luu
*Assistant Examiner* — Justin Seo
(74) *Attorney, Agent, or Firm* — Creative Technology Ltd

(57) ABSTRACT

There is provided a method and apparatus for reverse printing a plurality of images interlaced with each other on an underside surface of an appropriate flexible lenticular substrate. The method includes analyzing a viewing orientation of either portrait configuration or landscape configuration of at least one of the plurality of images; determining whether the appropriate flexible lenticular substrate is used for the printing of the plurality of images interlaced with each other in accordance with the viewing orientation of one of the plurality of images; analyzing an orientation of a first marker on the underside surface of the appropriate flexible lenticular substrate; and printing the plurality of images interlaced with each other in accordance with the orientation of the first marker on the underside of the appropriate flexible lenticular substrate. It is advantageous that the printed plurality of images interlaced with each other, when viewed through a top surface of the appropriate flexible lenticular substrate, appear to have characteristics selected from the group consisting of: depth, morphing characteristics, can appear to have motion, and the capability to alternate from one image to another.

19 Claims, 3 Drawing Sheets

ATUM±ΩΠ
Figure 2
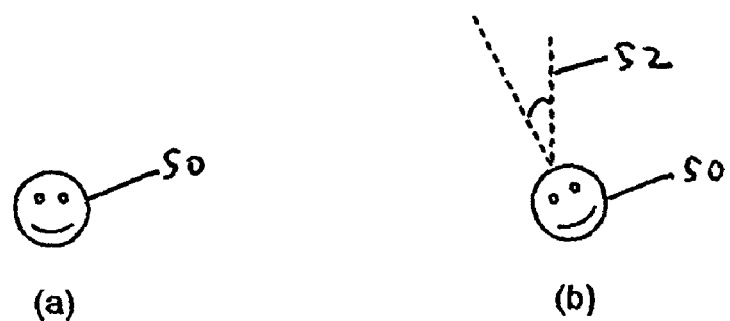
(a)  (b)
Figure 3
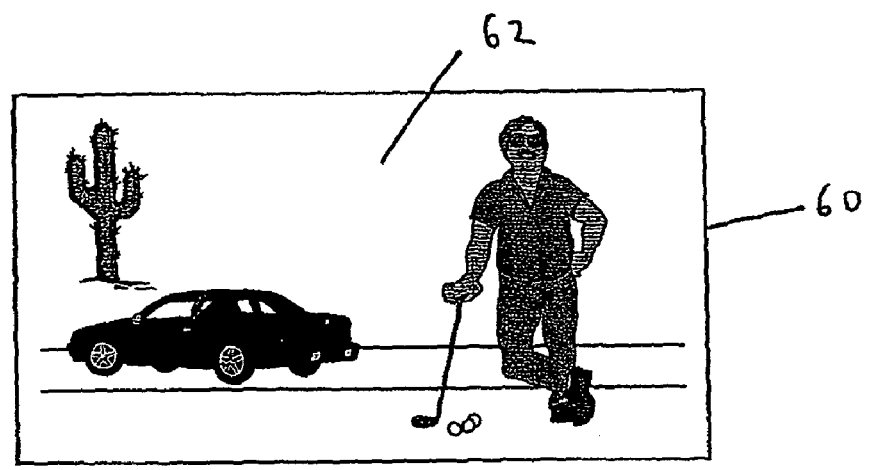
Figure 4

METHOD AND APPARATUS FOR REVERSE PRINTING ON A FLEXIBLE LENTICULAR SUBSTRATE

FIELD OF INVENTION

The present invention relates generally to a method and apparatus used for printing onto a flexible lenticular substrate.

BACKGROUND

In this information age, with a nearly limit-less selection of information sources vying for a consumers attention, it is becoming increasingly difficult to obtain a consumer's attention using conventional print media. One manner that may be employed to catch attention for print media involves the use of visual effects such as three dimensionality or motion imaging. One manner of employing these visual effects involves the use of lenticular substrates.

However, in order to experience the aforementioned visual effects, it is essential that the reverse printed image on the lenticular substrate is properly aligned with lenticules of the lenticular substrate. Failure to do a proper alignment would cause the visual effects to be less than desirable. In this regard, getting the proper alignment is essential.

Another aspect which is essential to experience the aforementioned visual effects relates to printing on appropriate lenticular substrates. The orientation of the lenticules would need to be as per the interlacing of the printed image. Failure to print on the appropriate lenticular substrate would also cause the visual effects to be less than desirable. Thus, printing on the appropriate lenticular substrate is also essential.

Finally, the printing should not be done onto a surface of the lenticular substrate incorporated with the lenticules as printing in such a manner would cause the visual effects to be non-existent. As such, ensuring that the right surface is printed upon is also essential.

SUMMARY

In a first aspect, there is provided a method for reverse printing a plurality of images interlaced with each other on an underside surface of an appropriate flexible lenticular substrate. The method includes analyzing a viewing orientation of either portrait configuration or landscape configuration of at least one of the plurality of images; determining whether the appropriate flexible lenticular substrate is used for the printing of the plurality of images interlaced with each other in accordance with the viewing orientation of one of the plurality of images; analyzing an orientation of a first marker on the underside surface of the appropriate flexible lenticular substrate; and printing the plurality of images interlaced with each other in accordance with the orientation of the first marker on the underside of the appropriate flexible lenticular substrate. It is advantageous that the printed plurality of images interlaced with each other, when viewed through a top surface of the appropriate flexible lenticular substrate, appear to have characteristics selected from the group consisting of: depth, morphing characteristics, can appear to have motion, and the capability to alternate from one image to another. The underside surface may be printable with either a laser printer or an ink jet printer.

A first portion of the top surface of the flexible lenticular substrate may have a plurality of lenticules being arranged in parallel while a second portion of the top surface of the flexible lenticular substrate may be featureless. It is advantageous that the second portion of the top surface of the flexible lenticular substrate allows for a non-distorted view of content printed on the underside of the flexible lenticular substrate. The content may be, for example, barcodes, visual indicia, fine print, information not intended to have a desired visual effect caused by viewing through the first portion and so forth.

Preferably, the flexible lenticular substrate with a plurality of lenticules being arranged in parallel in a landscape configuration on the flexible lenticular substrate is appropriate when the viewing orientation of at least one of the plurality of images is in the landscape configuration. Similarly, the flexible lenticular substrate with a plurality of lenticules being arranged in parallel in a portrait configuration on the flexible lenticular substrate is appropriate when the viewing orientation of at least one of the plurality of images is in the portrait configuration.

The first marker may include, for example, an alphanumeric character, a symbol, and a string of alphanumeric characters. It is preferable that the first marker is incorporated into the substrate during the substrate fabrication process using a technique such as, for example, etching, embossing, stamping and so forth. The first marker may be used to mark a first boundary of the first portion, and a second marker may be used to mark a second boundary of the first portion. The method may further include determining a distance between the first marker and the second marker to determine a printing width for the first portion. It is preferable that the markers are analysed by a visual sensor.

The method may further include viewing a representation of the appropriate flexible lenticular substrate positioned in accordance with the orientation of the at least one marker overlaid onto at least one of the plurality of images which are interlaced with each other. In an instance when the representation of the appropriate flexible lenticular substrate and at least one of the plurality of images are not in alignment, either the appropriate flexible lenticular substrate is repositioned or the plurality of images interlaced with each other are digitally re-sampled to match the alignment of the flexible lenticular substrate.

It is advantageous that an orientation and absence of the lenticules are analysed by a visual sensor to determine whether the appropriate flexible lenticular substrate is used. The absence of the lenticules may aid in determining a facing of the substrate. When the flexible lenticular substrate is deemed to be not appropriate, the user may perform a task such as, for example, replacing the flexible lenticular substrate, repositioning the flexible lenticular substrate, choosing to digitally re-sample the plurality of images interlaced with each other to match the flexible lenticular substrate and so forth.

The method may also further include monitoring at least one row of markers during printing to ensure that the substrate does not get mis-aligned during the printing of the plurality of images interlaced with each other.

In another aspect, there is provided an apparatus for reverse printing a plurality of images interlaced with each other, on an underside surface of an appropriate flexible lenticular substrate using the method of the first aspect. It is advantageous that viewing the printed plurality of images interlaced with each other through a top surface of the appropriate flexible lenticular substrate will enable the appearance of images with characteristics such as, for example, depth, morphing characteristics, can appear to have motion, the capability to alternate from one image to another and the like. The apparatus in this aspect may be either a laser printer or an ink jet printer.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

FIG. 2 shows examples of a marker employed in the present invention.

FIG. 3 shows a representation of how the marker is analysed in the present invention.

FIG. 4 shows an example of how a plurality of images interlaced with each other is previewed in the method of the present invention.

DESCRIPTION OF PREFERRED EMBODIMENTS

Figure 1:
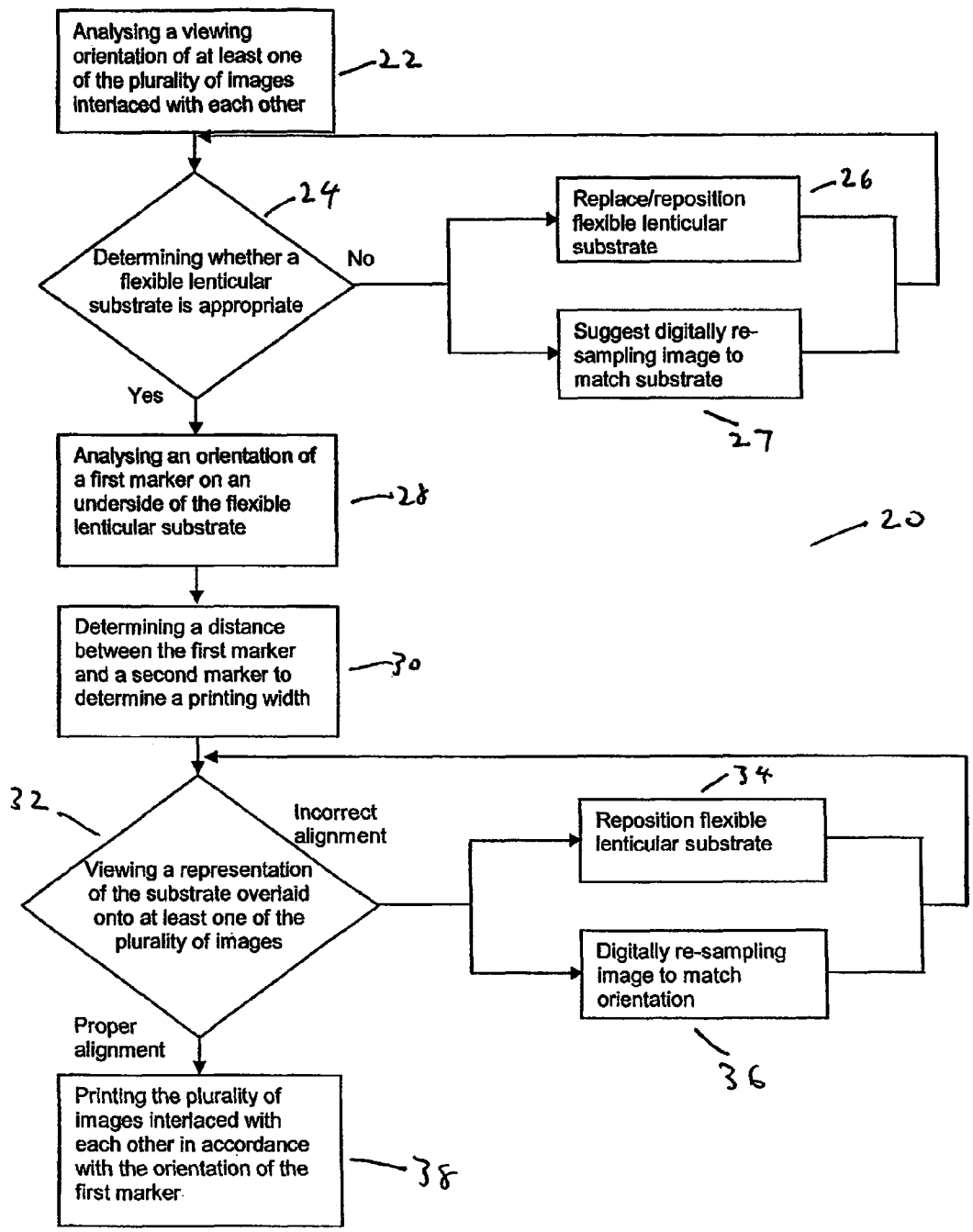
FIG. 1 shows a process flow of a method of the present invention.

In a preferred embodiment, there is disclosed in FIG. 1, a method 20 for reverse printing a plurality of images interlaced with each other, on an underside surface of an appropriate flexible lenticular substrate. The flexible lenticular substrate may be formed from any clear plastic sheet made from, for example, polyester, polycarbonate, acrylic, polyolefin, polyvinyl chloride, any thermoset resin and so forth.

A first portion of a top surface of the flexible lenticular substrate has a plurality of lenticules being arranged in parallel and a second portion of the top surface of the flexible lenticular substrate may be featureless. The first portion need not cover a greater area compared to the second portion. The first portion also need not have an identical shape to the second portion. The shapes of both portions may be variable. The second portion of the top surface of the flexible lenticular substrate may allow for a non-distorted view of content printed on the underside of the flexible lenticular substrate. The content may be, for example, barcodes, visual indicia, fine print, and information not intended to have a desired visual effect caused by viewing through the first portion. It is preferable that the underside surface of the flexible lenticular substrate is printable with either a laser printer or an ink jet printer. The underside surface may be treated using known methods to enable printing by either a laser printer or an ink jet printer.

The method 20 includes analyzing a viewing orientation of at least one of the plurality of images interlaced with each other 22. The analysis of the viewing orientation relates to determining whether at least one of the plurality of images is viewed in either a portrait configuration or a landscape configuration. It is generally understood that the plurality of images are in an identical viewing configuration so as to enable the desired visual effects. Determination of the viewing orientation is essential in relation to a subsequent step of determining whether the appropriate flexible lenticular substrate is used for the printing of the plurality of images interlaced with each other 24.

It should be noted that the flexible lenticular substrate with a plurality of lenticules being arranged in parallel in a landscape configuration on the flexible lenticular substrate is appropriate when the viewing orientation of at least one of the plurality of images is in the landscape configuration. Similarly, the flexible lenticular substrate with a plurality of lenticules being arranged in parallel in a portrait configuration on the flexible lenticular substrate is appropriate when the viewing orientation of at least one of the plurality of images is in the portrait configuration. The use of appropriate flexible lenticular substrates would aid in enabling a user to view the plurality of images interlaced with each other with desired visual effects with characteristics of, for example, depth, morphing characteristics, can appear to have motion, the capability to alternate from one image to another and the like. The orientation of the lenticules of each flexible lenticular substrate is analysed using a visual sensor to determine whether the appropriate flexible lenticular substrate is used.

If an inappropriate substrate is detected using the visual sensor, the flexible lenticular substrate is either replaced or repositioned 26 in a manner which causes the flexible lenticular substrate to be of the appropriate form. Alternatively, a suggestion to the user may be made using, for example, a message box, a visual indicator, an aural indicator and the like that there is an option to digitally re-sample the plurality of images interlaced with each other to match the substrate 27. If the visual sensor is able to detect any lenticules, the substrate is likely to be positioned with an incorrect facing (ie. the lenticular surface is where the printing surface is supposed to be). A notification to the user may in relation to the substrate facing may be made using, for example, a message box, a visual indicator, an aural indicator and the like. The substrate will then need to be flipped before proceeding with the method 20.

Once the flexible lenticular substrate is deemed to be of the appropriate form, a visual sensor (either the same unit as the prior mentioned visual sensor or another visual sensor) may analyse an orientation of a first marker on the underside surface of the appropriate flexible lenticular substrate 28. It should be noted that the first marker and any other markers are incorporated into the substrate during the substrate fabrication processes with, for example, embossing, etching, stamping and so forth. It is preferable that the first marker and any other markers are not incorporated in a secondary fabrication process such as printing as that may affect the consistency in relation to the positioning of the markers. The first marker may be located at, for example, an edge of the flexible lenticular substrate, a vertex of the flexible lenticular substrate, or a position which is concealed/covered subsequent to the printing a plurality of images interlaced with each other. The first marker may also be used to mark a first boundary of the first portion, and a second marker may be used to mark a second boundary of the first portion. The second marker may be identical to the first marker.

The first marker may be, for example, an alphanumeric character, a symbol, a string of alphanumeric characters and so forth. Examples of the first marker are shown in FIG. 2. FIG. 2 shows markers which are symmetrical about one axis. A string of characters is shown in FIG. 2, but each character may be used individually. FIG. 3 shows how the orientation of the first marker is analysed by the visual sensor. FIG. 3(a) shows the first marker 50 in a first orientation. FIG. 3(b) shows the first marker 50 in a second orientation which is inclined at an angle to a vertical axis 52. Thus, the angle to the vertical axis 52 would indicate that the flexible lenticular substrate is not positioned in a straight manner which occurs when the first marker 50 is in the first orientation. Markers which are not symmetrical about one axis may also be employed, such as, for example, a string "creative". In this instance, text recognition processes may be applied to the string. A purpose for the first marker analysis may be to align the interlacing gaps of the plurality of images to the lenticules of the flexible lenticular substrate. As such, the printing of the plurality of images interlaced with each other will need to be adjusted according to the angle so as to be printed on the flexible lenticular substrate in a manner which would aid in enabling the user to view the plurality of images interlaced with each other with desired visual effects. In addition, the visual sensor may also be employed to determine a distance between the first marker and the second marker to determine a printing width for the first portion 30. The printing width for the first portion 30 may also aid in locating a printing area of the second portion to print content such as, for example, barcodes, visual indicia, fine print, and information not intended to have a desired visual effect caused by viewing through the first portion. The content may be printed simultaneously when printing the plurality of images interlaced with each other.

Figure 5:
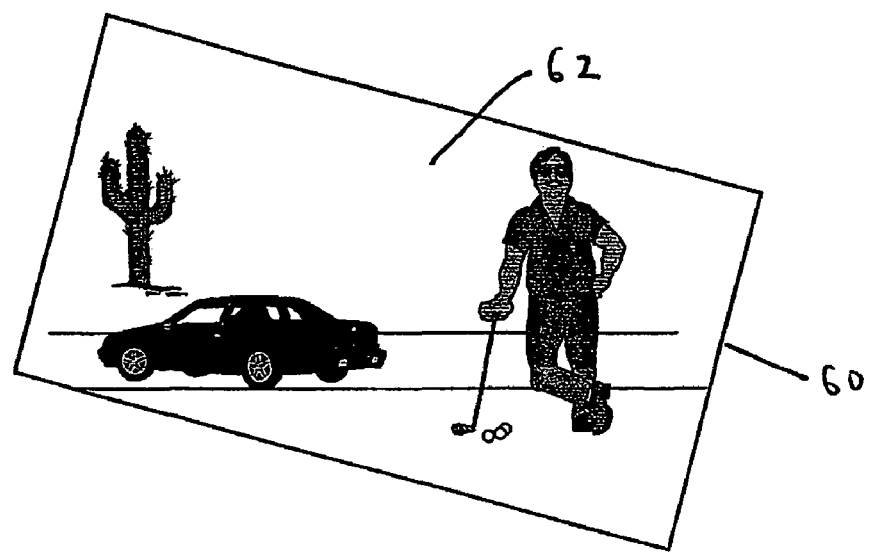
FIG. 5 shows an example of how an out-of-alignment plurality of images interlaced with each other appears in the preview in the method of the present invention.

Subsequently, the user may also view a representation of the appropriate flexible lenticular substrate positioned in accordance with the orientation of the at least one marker overlaid onto the plurality of images interlaced with each other 32. This is shown in FIG. 4. The representation of a physical position of the appropriate flexible lenticular substrate 60 in accordance with the orientation of the at least one marker is overlaid on at least one of the plurality of images interlaced with each other 62. A purpose for this step 32 may be to aid the user in determining that the plurality of images interlaced with each other is aligned with the appropriate flexible lenticular substrate prior to printing. For example, if the representation of the physical position of the appropriate flexible lenticular substrate 60 is tilted, the at least one of the plurality of images interlaced with each other 62 may also be shown to be tilted and thus, correctly aligned. FIG. 5 shows an appearance of how the at least one of the plurality of images interlaced with each other 62 is not aligned with the representation of the physical position of the appropriate flexible lenticular substrate 60. If the alignment is not done properly, either the flexible lenticular substrate is repositioned 34 or the plurality of images interlaced with each other are digitally re-sampled to match the alignment of the flexible lenticular substrate 36.

Figure 6:
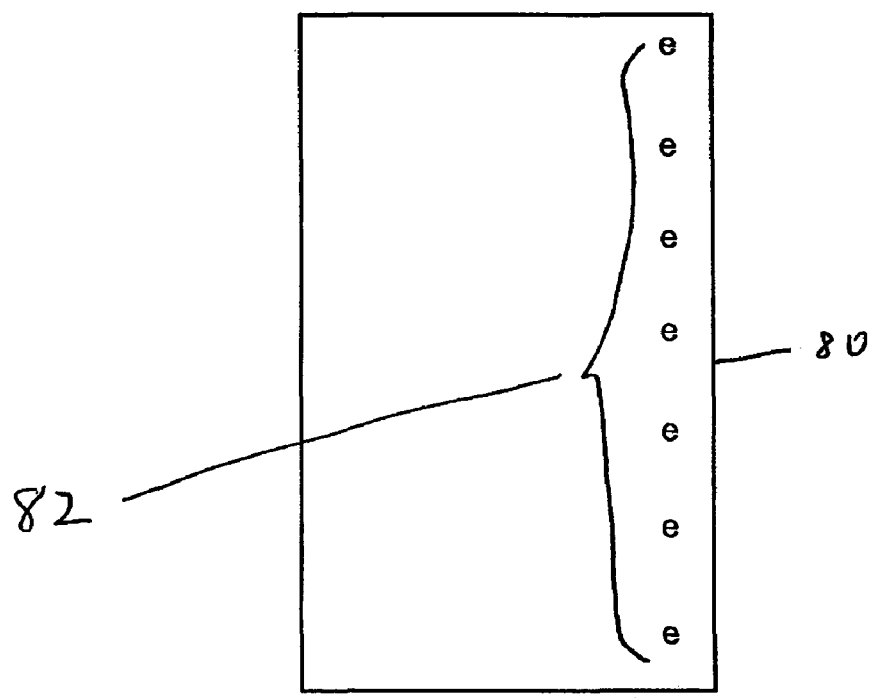
FIG. 6 shows an example of how markers on a substrate are arranged for aligned printing on the substrate in the method of the present invention.

Finally, printing of the plurality of images interlaced with each other in accordance with the orientation of the first marker onto the underside of the appropriate flexible lenticular substrate is performed 38. The printing is in the form of reverse printing (the image is laterally inverted) as the print is viewed from a top surface of the appropriate flexible lenticular substrate. Referring to FIG. 6, each appropriate flexible lenticular substrate 80 may include at least one row of markers 82 spaced at an identical distance from each other which are monitored by a visual sensor during printing to ensure that the substrate 80 does not get displaced and correspondingly, mis-aligned during the printing of the plurality of images interlaced with each other.

Subsequent to printing, a background may be adhered to the underside of the appropriate flexible lenticular substrate. Alternatively, the flexible lenticular substrate with printing on the underside may be placed in a frame which may be used to provide the background. The printed plurality of images interlaced with each other, when viewed through the top surface of the appropriate flexible lenticular substrate have characteristics such as, for example, depth, morphing characteristics, can appear to have motion, the capability to alternate from one image to another and the like.

In another aspect, there is provided an apparatus for reverse printing a plurality of images interlaced with each other, on an underside surface of an appropriate flexible lenticular substrate using the preferred embodiment of the aforementioned method. The printed plurality of images interlaced with each other, when viewed through a top surface of the appropriate flexible lenticular substrate, also appear to have characteristics such as, for example, depth, morphing characteristics, can appear to have motion, the capability to alternate from one image to another and so forth. The apparatus may be in the form of either a laser printer or an ink jet printer.

Whilst there has been described in the foregoing description preferred embodiments of the present invention, it will be understood by those skilled in the technology concerned that many variations or modifications in details of design or construction may be made without departing from the present invention.

The invention claimed is:

1. A method for reverse printing a plurality of images interlaced with each other, on an underside surface of an appropriate flexible lenticular substrate, the method including:
   analyzing a viewing orientation of either portrait configuration or landscape configuration of at least one of the plurality of images;
   determining whether the appropriate flexible lenticular substrate is used for the printing of the plurality of images interlaced with each other in accordance with the viewing orientation of one of the plurality of images;
   analyzing an orientation of a first marker on the underside surface of the appropriate flexible lenticular substrate; and
   printing the plurality of images interlaced with each other in accordance with the orientation of the first marker on the underside of the appropriate flexible lenticular substrate;
   wherein the printed plurality of images interlaced with each other, when viewed through a top surface of the appropriate flexible lenticular substrate, appear to have characteristics selected from the group consisting of: depth, morphing characteristics, can appear to have motion, and the capability to alternate from one image to another.

2. The method as claimed in claim 1, wherein a first portion of the top surface of the flexible lenticular substrate has a plurality of lenticules being arranged in parallel and a second portion of the top surface of the flexible lenticular substrate being featureless.

3. The method as claimed in claim 2, wherein the flexible lenticular substrate with a plurality of lenticules being arranged in parallel in a landscape configuration on the flexible lenticular substrate is appropriate when the viewing orientation of at least one of the plurality of images is in the landscape configuration.

4. The method as claimed in claim 2, wherein the flexible lenticular substrate with a plurality of lenticules being arranged in parallel in a portrait configuration on the flexible lenticular substrate is appropriate when the viewing orientation of at least one of the plurality of images is in the portrait configuration.

5. The method as claimed in claim 2, wherein the second portion of the top surface of the flexible lenticular substrate allows for a non-distorted view of content printed on the underside of the flexible lenticular substrate, the content being selected from the group consisting of: barcodes, visual indicia, fine print and information not intended to have a desired visual effect caused by viewing through the first portion.

6. The method as claimed in claim 1, wherein the underside surface is printable with either a laser printer or an ink jet printer.

7. The method as claimed in claim 1, wherein the first marker is selected from the group consisting of: an alphanumeric character, a symbol, and a string of alphanumeric characters.

8. The method as claimed in claim 7, wherein the first marker is incorporated into the substrate during the substrate fabrication process using a technique selected from the group consisting of: etching, embossing, and stamping.

9. The method as claimed in claim 2, wherein the first marker is used to mark a first boundary of the first portion, and a second marker is used to mark a second boundary of the first portion.

10. The method as claimed in claim 9, further including determining a distance between the first marker and the second marker to determine a printing width for the first portion.

11. The method as claimed in claim 9, wherein the markers are analysed by a visual sensor.

12. The method as claimed in claim 1, further including viewing a representation of the appropriate flexible lenticular substrate positioned in accordance with the orientation of the at least one marker overlaid onto at least one of the plurality of images interlaced with each other.

13. The method as claimed in claim 12, wherein when the representation of the appropriate flexible lenticular substrate and at least one of the plurality of images are not in alignment, either the appropriate flexible lenticular substrate is repositioned or the plurality of images interlaced with each other are digitally re-sampled to match the alignment of the flexible lenticular substrate.

14. The method as claimed in claim 2, wherein an orientation and absence of the lenticules are analysed by a visual sensor to determine whether the appropriate flexible lenticular substrate is used.

15. The method as claimed in claim 1, further including monitoring at least one row of markers during printing to ensure that the substrate does not get mis-aligned during the printing of the plurality of images interlaced with each other.

16. The method as claimed in claim 14, wherein the absence of the lenticules aids in determining a facing of the substrate.

17. The method as claimed in claim 1, wherein when the flexible lenticular substrate is not appropriate, a user performs a task selected from the group consisting of: replacing the flexible lenticular substrate, repositioning the flexible lenticular substrate, and choosing to digitally re-sample the plurality of images interlaced with each other to match the flexible lenticular substrate.

18. An apparatus for reverse printing a plurality of images interlaced with each other, on an underside surface of an appropriate flexible lenticular substrate using the method of claim 1.

19. The apparatus as claimed in claim 18 being either a laser printer or an ink jet printer.

\* \* \* \* \*